United States Patent
Vasey

(10) Patent No.: US 7,992,080 B2
(45) Date of Patent: Aug. 2, 2011

(54) RE-USABLE CLAUSES

(75) Inventor: Philip E. Vasey, Southwold (GB)

(73) Assignee: Business Integrity Limited, London (GB)

( * ) Notice: Subject to any disclaimer, the term of this patent is extended or adjusted under 35 U.S.C. 154(b) by 1018 days.

(21) Appl. No.: 11/668,721

(22) Filed: Jan. 30, 2007

(65) Prior Publication Data

US 2007/0192688 A1 Aug. 16, 2007

Related U.S. Application Data

(60) Provisional application No. 60/763,406, filed on Jan. 30, 2006.

(51) Int. Cl.
*G06F 17/00* (2006.01)
(52) U.S. Cl. ......... 715/234; 715/204; 715/209; 715/221
(58) Field of Classification Search .................. 715/204, 715/209, 221, 234
See application file for complete search history.

(56) References Cited

U.S. PATENT DOCUMENTS

| | | | | |
|---|---|---|---|---|
| 6,182,095 B1 * | 1/2001 | Leymaster et al. | ........... | 715/236 |
| 7,415,663 B1 * | 8/2008 | Kraus | ........................... | 715/200 |
| 7,831,442 B1 * | 11/2010 | Chappel | ............................ | 705/2 |
| 7,877,679 B2 * | 1/2011 | Ozana | ........................... | 715/221 |
| 2002/0035486 A1 * | 3/2002 | Huyn et al. | ........................ | 705/3 |
| 2002/0046235 A1 * | 4/2002 | Foy et al. | ........................ | 709/203 |
| 2002/0129056 A1 * | 9/2002 | Conant et al. | .................. | 707/511 |

OTHER PUBLICATIONS

GB0701754.4, Search Report.
LexisNexis, "Learn How Clauses and Clause Libraries Work" (online), 2007, http://support.hotdocs.com/knowledgebase/developer_corner/Learn_how_clauses_and-Clause-Libraries_work.htm, Apr. 5, 2007.
LexisNexis, "Add a Clause from Another Clause Library to a Template" (online) 2007, http://support.hotdocs.com/knowledgebase/developer_corner/add_a_clause_from_another_clause_library_to-a_template.htm Apr. 5, 2007.
Kyte, "Six Keys to Better Procurement Contract Management" Mar. 20, 2003, Gartner Research; www.ketera.com/pdf/gartner%20research%20on%20six%20keys%20to%20better%procurement%20contract%20management.pdf, Apr. 5, 2007.

* cited by examiner

*Primary Examiner* — Stephen S Hong
*Assistant Examiner* — Matthew J Ludwig
(74) *Attorney, Agent, or Firm* — Anderson Gorecki & Manaras LLP

(57) ABSTRACT

The present invention relates to the generation of customised documents using document templates and in particular to the generation of different types of customised documents including clauses or other portions of document content which are common to two or more types of customised document.

14 Claims, 2 Drawing Sheets

RE-USABLE CLAUSES

CROSS-REFERENCE TO RELATED APPLICATIONS

A claim of priority is made to U.S. Provisional Patent Application 60/763,406, titled Re-usable Clauses, filed Jan. 30, 2006, which is incorporated by reference.

FIELD OF THE INVENTION

The present invention relates to the generation of customised documents using document templates and in particular to the generation of different types of customised documents including clauses or other portions of document content which are common to two or more types of customised document.

BACKGROUND OF THE INVENTION

It is known to create customised documents using document templates or master documents. In our system, customised documents are generated using master documents which contain portions of document content, such as text or images, which are selectively incorporated into the resulting customised documents. For example, portions of document content included in the master document may be included in the final customised document only if certain conditions are satisfied. Such portions of document content may be referred to as conditional document content. The master document may also include portions of document content which are included unconditionally in the final customised document.

In one example, a social services document customised to a particular person who is the subject of the document may be generated from a master document. If the subject is pregnant then the final document may need to include a portion of text relating to the pregnancy. In this case the master document contains a specific text portion relating to pregnancy which is only included in the final customised document if it has been determined that the subject is actually pregnant. The final document may also need to include a standard clause which is included regardless of pregnancy but whose wording differs depending on whether the subject is male or female. In this case, the master document contains two text portions corresponding to the alternative clause wordings. One or the other of the two text portions is selectively included in the customised document depending on whether the subject is male or female.

The information required to generate a customised document may be represented by one or more variables. In the examples given above, a first variable 'Pregnant' which can take one of the two values 'True' or 'False' is used to represent whether the subject is pregnant or not. A second variable 'Gender' which can take one of the two values 'Male' or 'Female' is used to represent the gender of the subject. In our system, the variables may also take values indicating that the value of a variable is unknown or indefinite.

The variables associated with a master document may be used to form logical statements which may in turn be used to specify the conditions which need to be satisfied for each portion of document content to be included in the customised document. For example, the logical statement Gender IS 'Female' may be formed which evaluates to True if the subject is female and evaluates to False if the subject is male. This logical statement represents the condition which must be satisfied (i.e. evaluate to True) for the standard clause relating to female subjects to be included in the customised document.

The simplest logical statement is a variable such as 'Pregnant', which can take the values True and False, appearing on its own. In this case the evaluation of the logical statement is simply the value of the variable. Such a variable, 'Variable', appearing on its own as a logical statement may be considered to be shorthand for Variable IS 'True'. More complicated logical statements may also be formed by combining simpler statements using the logical operators AND, OR and NOT. For example, the logical statement (Gender IS 'Female') AND NOT (Pregnant) may be formed which evaluates to True only if the subject is female and not pregnant. The conditions (in the form of logical statements) which dictate whether particular portions of document content are included in the customised document may be referred to as usage statements.

The way in which portions of document content are incorporated into customised documents may be represented in the form of a mark-up of the master document. For example, a portion of conditional text in the master document may be indicated as such by enclosing the text in square bracket, [ . . . conditional text . . . ]. The usage statement associated with a particular portion of document content is indicated as superscript on the inside of the left-hand bracket associated with the portion of document content, [$^{Usage\ Statement}$ . . . conditional text . . . ]. The conditional document content is included in the customised document only if the usage statement associated with that conditional document content evaluates to True. For example, the mark-up [$^{Gender\ IS\ 'Male'}$ Text portion 1 . . . ] indicates that the text 'Text portion 1 . . . ' is included in the customised document only if the subject is male. Similarly, the mark-up [$^{Pregnant}$ Text portion 2 . . . ] indicates that the text 'Text portion 2 . . . ' is included in the customised document only if the subject is pregnant. In the example given above where alternative clause wordings are used depending on whether the subject is male or female, the master document contains [$^{Gender\ IS\ 'Male'}$ Clause wording 1 . . . ] [$^{Gender\ IS\ 'Female'}$ Clause wording 2 . . . ]. The position of the document content in the customised document depends on the position of the document content within the master document.

Variables such as 'Name' or 'Address' may also appear in the text portions. When a variable appears within a portion of text, the variable may be distinguished from the rest of the text by being shown between curly brackets, {variable}. One example of a conditional text portion illustrating this is [$^{Pregnant}$ The mother is {Name} who lives at {Address} . . . ].

Although the examples given above represents one form of mark-up, other forms of mark-up may also be used. Our U.S. patent application Ser. No. 10/434,753, incorporated herein by reference, discloses two different forms of mark-up notation and a system and method for converting a master document written in one mark-up notation to a master document written in a different mark-up notation. More complex mark-up notation may also be used. For example, our International patent applications, publication numbers WO 2005/024653, WO 2005/024654, WO 2005/024656 and WO 2005/024660, incorporated herein by reference, disclose several examples.

In order to generate a fully customised document it is necessary to determine the values of all the relevant variables so that the usage statements can be evaluated which in turn allows a determination to be made as to which of the portions of conditional document content to include in the final customised document. This information may be collected by means of a questionnaire which a user completes to assign values to the variables. In the examples given above, a user may be asked a first question enquiring as to the gender of the subject. A second question may then be asked enquiring as to whether the subject is pregnant. The questionnaire may be presented to the user in the form of a series of web pages for example in which the user types answers into text boxes or checks tick boxes corresponding to predefined alternative answers. The questionnaire may be generated automatically by analyzing the master document and determining from the mark-up and the variables present which questions to ask. Our International patent applications, publication numbers WO 01/04772 and WO 03/061474, incorporated herein by reference, disclose systems and methods for generating a questionnaire from a master document.

Different master documents are used to generate different types of customised document. Examples of different types of documents include different types of legal contracts such as lease agreements and assignment documents. With these examples, a first master document would be used to generate lease agreements while a second master document would be used to generate assignment documents. Although the various types of customised documents are different in form they may each include common portions of document content. For example, both lease agreements and assignment documents may include a standard clause specifying the law governing the document. The particular wording of the governing law clause included in a customised document is selected from several alternative wordings according to the jurisdiction involved. In this case each master document would contain the following portions of conditional text for example, only one of which would appear in the customised document.

[$^{Jurisdiction\ IS\ `USA`}$ This agreement is governed by the laws of the United States of America.]

[$^{Jurisdiction\ IS\ `Europe`}$ This agreement is governed by the laws of the European Union.]

[$^{Jurisdiction\ IS\ `Japan`}$ This agreement is governed by the laws of Japan.]

[$^{Jurisdiction\ IS\ `Other`}$ This agreement is not governed by any specific jurisdiction.]

A clause of a particular type, such as a governing law clause may be referred to as a clause type. A particular instance of a clause type, such as the USA governing law wording may be referred to as a clause instance.

Rather than including each clause instance in each master document, it is often more convenient to include the clause wordings in a separate document which can be accessed by each of the master documents. Such a document may be referred to as a clause file or clause document. In the above example, the alternative clause wordings for the governing law clause represented as portions of conditional text may be stored in a clause file called 'GOVERNING_LAW_CLAUSE'. Then, any master document which needs to include a governing law clause includes the mark-up {include GOVERNING_LAW_CLAUSE} at the appropriate point in the master document. This mark-up, referred to as an include command, specifies that the contents of the GOVERNING_LAW_CLAUSE file should be inserted into the master document at that point. As used herein, the term 'file' is intended in a broad sense to include, for example, any self-contained portion of data.

Other clause types, such as a clause specifying the term of an agreement may be provided in other clause files. A collection of clause files relating to different types of clause may be arranged top form a clause library. Alternatively, a clause library may comprise a single file comprising different sections corresponding to the clause files.

The advantage of the technique described above is that when the wording of a clause needs to be changed, for example because of a change in the law, then the change only needs to be made in one place in the clause file, rather than in each master document which uses the clause. This greatly facilitates maintenance of the document generation system.

Sometimes, even though different master documents use common wording for particular standard clauses, the conditions which dictate which variation of the clause wording is incorporated into a customised document may vary. For example, in one master agreement the jurisdiction in the context of a law governing clause may depend on the location of the sales office. In this case, the clause file would contain the following portions of conditional text for example.

[$^{Sales\ Office\ IS\ `New\ York`}$ This agreement is governed by the laws of the United States of America.]

[$^{Sales\ Office\ IS\ `London`\ OR\ Sales\ Office\ IS\ `Paris`}$ This agreement is governed by the laws of the European Union.]

[$^{Sales\ Office\ IS\ `Other`}$ This agreement is not governed by any specific jurisdiction.]

However, in another master agreement the jurisdiction in the context of a law governing clause may depend on the location of the sales region. In this case, the clause file would contain the following portions of document content for example.

[$^{Sales\ Region\ IS\ `North\ America`}$ This agreement is governed by the laws of the United States of America.]

[$^{Sales\ Region\ IS\ NOT\ `North\ America`}$ This agreement is governed by the laws of the European Union.]

In such cases, two separate clause files could be provided for the governing law clause. However, this technique negates the advantage of having a single clause file for maintenance. One alternative solution is to specialize the clause file to take into account where and how the clause is being used. For example, the usage statements in the clause file could depend on which master document the clause is being used in. In this case, the clause document would contain the following portions of conditional text for example.

[$^{(Agreement\ A\ AND\ Sales\ Office\ IS\ `New\ York`)\ OR\ (Agreement\ B\ AND\ Sales\ Region\ IS\ `North\ America`)}$ This agreement is governed by the laws of the USA.]

[$^{(Agreement\ A\ AND\ (Sales\ Office\ IS\ `London`\ OR\ Sales\ Office\ IS\ `Paris`))\ OR\ (Agreement\ B\ AND\ Sales\ Region\ IS\ NOT\ `North\ America`)}$ This agreement is governed by the laws of the European Union.]

[$^{Agreement\ A\ AND\ Sales\ Office\ IS\ `Other`}$ This agreement is not governed by any specific jurisdiction.]

However, this technique suffers several disadvantages. First, the usage statements involved can become very complex very quickly. This means that design of clause files can become complex and error prone. Second, the usage statements involve variables that relate to the master documents. This means that if new masters are designed, the clause files would also need to be modified so that the new master documents could use the clause files. Thirdly, the logic to select a clause instance is embedded within the clause document. This means that the clause files contain information associated with specific master documents which, from a logical point of view, is undesirable if clause files are intended to be master document independent.

We have appreciated the need to provide a system and method in which common portions of conditional document content can be shared between different master documents which do not suffer the disadvantages set out above.

DESCRIPTION OF PREFERRED EMBODIMENTS

Figure 1:
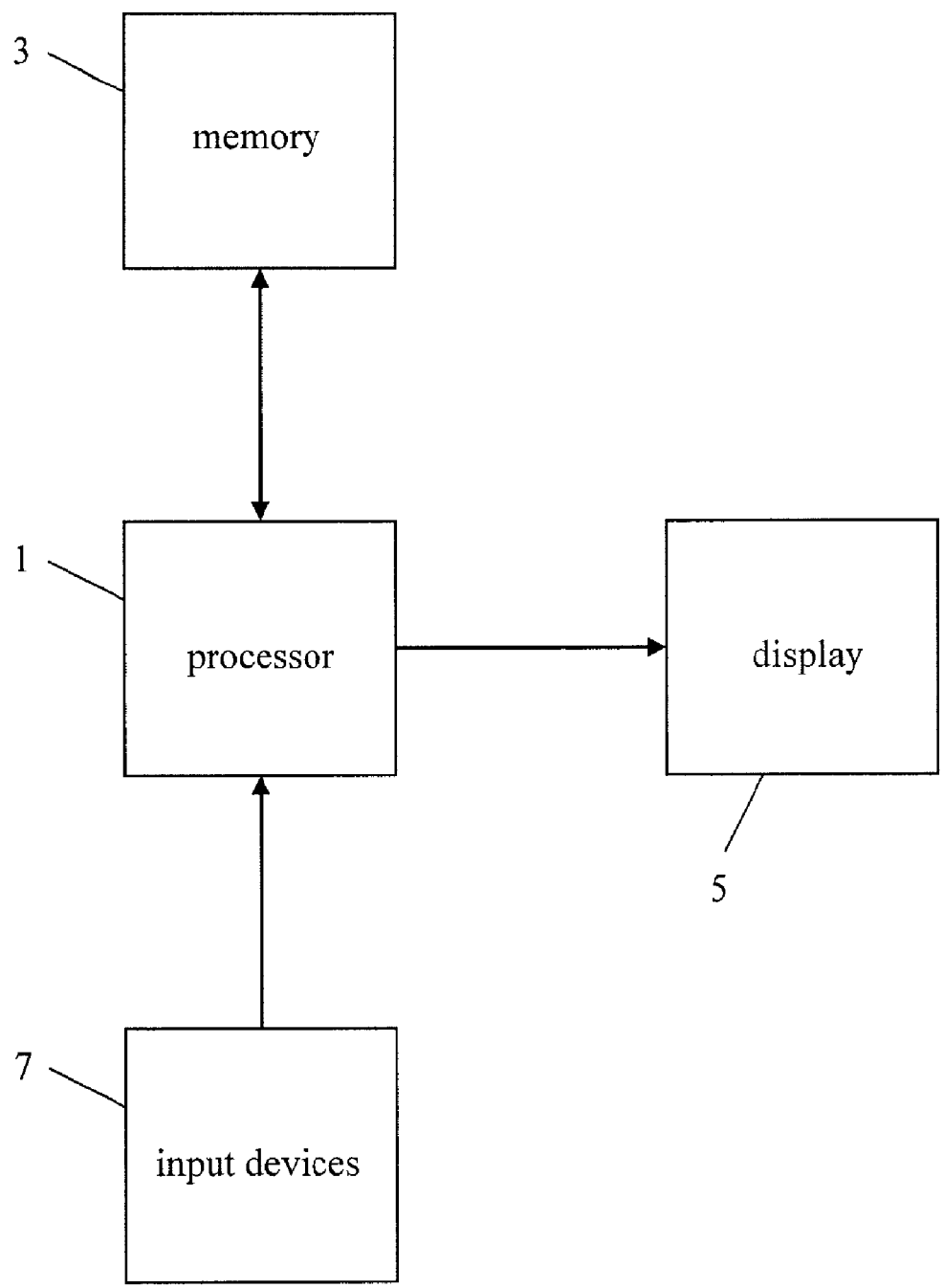
FIG. 1 is a schematic diagram of a system in which the invention may be employed.

In an exemplary embodiment of the invention, the usage statements in the clause files are replaced with usage tags which are generic in the sense that the same usage tag can be used independently of the master document using the clause file. However, the specific definitions of the usage tags are contained elsewhere (i.e. not within the clause file), for example in the master documents. The usage tag definitions allow the usage tags to be evaluated which in turn dictates which portions of document content are included in the customised document. This method allows different master documents to define the usage tags in different ways so that different master documents can apply different conditions to the conditional portions of document content.

For example, In the governing law clause example above, the three usage tags 'USA', 'Europe' and 'Rest of World' may be used. One exemplary clause file contains the following portions of conditional text.

[$^{USA}$ This agreement is governed by the laws of the United States of America.]

[$^{Europe}$ This agreement is governed by the laws of the European Union.]

[$^{Rest\ of\ World}$ This agreement is not governed by any specific jurisdiction.]

The portions of conditional text which are included in the customised document cannot be determined until the usage tags are defined. As mentioned above, the usage tags may be defined in each master document. For example, in one master document the usage tags are defined in terms of usage statements as follows.

| | |
|---|---|
| USA | Sales Office IS 'New York' |
| Europe | Sales Office IS 'London' OR Sales Office IS 'Paris' |
| Rest of World | Sales Office IS 'Other' |

In another master document the usage tags are defined as follows.

| | |
|---|---|
| USA | Sales Region IS 'North America' |
| Europe | Sales Region IS NOT 'North America' |
| Rest of World | FALSE |

When a master document uses a clause type, the clause file for that clause type is identified in the master document at the location at which the clause is to appear using the mark-up {include CLAUSE_FILE_NAME}. Then, when the master document is processed to create a customised document, at the specified point, the contents of the clause file are inserted into the master document. The usage tags are then replaced with their definitions specified in the master document. After this process has been carried out, the master document can be processed normally by generating a questionnaire to collect information from a user to allow the usage statements to be evaluated and a customised document to be generated.

Items such as usage tags, usage statements and variables used in the method described above may be referred to collectively as document elements.

In addition to the definition of the usage tags, the master document may also contain a description of the attributes of the variables appearing in the usage tags definitions and other variables used in the clause file. This information is used to generate the part of the questionnaire used to collect information concerning the variables used in the usage tag definitions and the other variables used in the clause file.

For example, the variable attribute description may comprises the name of the variable, an alias for the variable and a prompt, specified respectively in name, alias and prompt fields. The prompt is displayed in the questionnaire to prompt a user to provide information. The alias may be displayed next to the prompt to indicate to the user which variable the question relates to.

The variable attribute description may also comprise a type field containing information specifying the type of input required to assign a value to the variable. This could specify for example 'select' if a user is required to make a selection from one or more predefined selections, or 'date' if a user is required to enter a date in a text box. The questionnaire may use the type field to properly configure the input interface for each question. Where the input type is 'select' the variable attribute description may comprise a selection field which specifies the possible selections. The variable attribute description may also comprise a form field which specifies any relevant restrictions on the input. For example, if the type of input is 'select' then the form field may specify that the user input is restricted to making exactly one selection. Alternatively, the form field may specify that the user may make two or more selections. In another example, when the type of input is 'number' then the form field may specify that an integer is required.

Each master document comprises the usage tag definitions and variable attribute descriptions for each clause type included in it. The variable attribute descriptions may also include variables which appear in the master document but which do not necessarily appear in any clause files.

In other embodiments, the usage tag definitions and/or variable attribute descriptions are specified not in the master document itself but in a separate file or files which may be associated with the master document. For example, the master document may contain a reference to a file in which the appropriate usage tag definitions are specified.

Using the method described above only a single clause file needs to be provided for each clause type, each clause file making no reference to the master documents which may use the clause.

Several examples illustrating the invention will now be described involving three types of clause.

Governing Law Clause Examples

The first set of examples concerns agreements which use a governing law clause defined in a clause file called GOVERNING_LAW_CLAUSE. The governing law clause file contains the following portions of conditional text associated with the usage tags 'USA', 'Europe' and 'Japan'.

[$^{USA}$ This agreement is governed by the laws of the United States of America.]

[$^{Europe}$ This agreement is governed by the laws of the European Union.]

[$^{Japan}$ This agreement is governed by the laws of Japan.]

The governing law clause may be included in a master document using the mark-up {include GOVERNING_LAW_CLAUSE}.

In a first master document, the following usage tag definitions may be used. These definitions involve the variable 'SalesRegion'.

| Usage Tag | Definition |
|---|---|
| Europe | SalesRegion IS 'Europe' |
| Japan | SalesRegion IS 'Asia' |
| USA | SalesRegion IS 'USA' |
|  | OR |
|  | Sales Region IS 'Other' |

The value of 'SalesRegion' needs to be determined in order to evaluate the usage tags and this information is collected by means of the questionnaire. The variable attribute description for the variable 'SalesRegion' may be specified in the master document as follows. This description is used by the questionnaire to configure the question relating to the sales region.

| Name | Alias | Prompt | Type | Form | Selections |
|---|---|---|---|---|---|
| SalesRegion | Sales Region | Select the sales region: | select | single_other | Europe Asia USA |

In the form field of the variable attribute description, 'single_other' specifies that the user may select one of the options specified in the selection field, and if no selection is made, the variable takes the value 'Other'.

In a second master document, the following alternative usage tag definitions may be used. These definitions involve the variable 'SalesOffice'.

| Usage Tag | Definition |
|---|---|
| Europe | SalesOffice IS 'London' |
|  | OR |
|  | SalesOffice IS 'Paris' |
|  | OR |
|  | SalesOffice IS 'Frankfurt' |
| Japan | SalesOffice IS 'Kyoto' |
|  | OR |
|  | SalesOffice IS 'Sydney' |
| USA | SalesOffice IS 'New York' |

In this case, the variable attribute description for the variable 'SalesOffice' may be specified in the master document as follows.

| Name | Alias | Prompt | Type | Form | Selections |
|---|---|---|---|---|---|
| SalesOffice | Sales Office | Select the sales office: | select | single | Frankfurt Kyoto London New York Paris Sydney |

In a third master document, the agreement is always governed by United States law. Therefore, the following usage tag definitions are specified in the master document.

| Usage Tag | Definition |
|---|---|
| Europe | False |
| Japan | False |
| USA | True |

In this case, since the usage statements do not involve any variables, there are no variable attribute descriptions.

Term Clause Examples

The second set of examples concerns agreements which use a term clause specifying the start and end dates of the agreement. The term clause is defined in a file TERM_CLAUSE which refers to usage tags with the following meanings.

| | |
|---|---|
| Start Agreement | the term starts on the date of the agreement |
| Start Absolute | the term starts on a specified date |
| Finish Absolute | the term finishes on a specified date |
| Finish Relative | the term finishes a specified number of years after the start |
| Finish Open | the term is open, with no specific finish |

There are six variations of the term clause resulting in the combinations of two start variations and three finish variations. The term clause file therefore contains the following six portions of conditional text, one of which may possibly be selected for inclusion in the customised document.

[$^{Start\ Agreement\ AND\ Finish\ Absolute}$ The term of this agreement is from the date of this agreement to {FinishDate}.]

[$^{Start\ Agreement\ AND\ Finish\ Relative}$ The term of this agreement is for {TermPeriod} years from the date of this agreement.]

[$^{Start\ Agreement\ AND\ Finish\ Open}$ The term of this agreement is open from the date of this agreement.]

[$^{Start\ Absolute\ AND\ Finish\ Absolute}$ The term of this agreement is from {StartDate} to {Finish Date}.]

[$^{Start\ Absolute\ AND\ Finish\ Relative}$ The term of this agreement is for {TermPeriod} years from {StartDate}.]

[$^{Start\ Absolute\ AND\ Finish\ Open}$ The term of this agreement is open from {StartDate}.]

Some of the portions of conditional text contain one or more of the following variables.

| | |
|---|---|
| StartDate | the specified date on which the term starts |
| FinishDate | the specified date on which the term finishes |
| TermPeriod | the specified period (in years) for the term |

The term clause may be included in a master document using the mark-up {include TERM_CLAUSE}.

In a first master document, the following usage tag definitions may be used. These definitions involve the variables 'TermStart' and 'TermFinish'.

| Usage Tag | Definitions |
|---|---|
| Start Agreement | TermStart IS 'Agreement Date' |
| Start Absolute | TermStart IS 'Specific Date' |
| Finish Absolute | TermFinish is 'Specific Date' |
| Finish Relative | TermFinish IS 'Specific Period' |
| Finish Open | TermFinish IS 'Open' |

Five variables are used in the term clause; two appear in the usage tag definitions and three appear as variables within portions of conditional text. Values need to be assigned to these variables by means of the questionnaire to generate a customised document. The variable attribute descriptions for these five variables may be specified in the master document as follows.

| Name | Alias | Prompt | Type | Form | Selections |
|---|---|---|---|---|---|
| TermStart | Term Start | When does the term start: | select | single | Agreement Date Specific Date |
| TermFinish | Term Finish | When does the term finish: | select | single | Specific Date Specific Period Open |
| StartDate | Term Start Date | Enter the specific start date: | date | | |
| FinishDate | Term Finish Date | Enter the specific finish date: | date | | |
| TermPeriod | Term Finish Years | Enter the number of years: | number | integer | |

In this example, one or more of these variables may not be relevant depending on the values assigned to the variables 'TermStart' and 'TermFinish'. For example, if TermStart is assigned the value 'Agreement Date', the variable StartDate is not relevant since the user need not provide a start date as the start date is set by the date of the agreement. Our earlier International patent application publication number WO 2005/024655 and our provisional U.S. patent application Ser. No. 60/710,727, incorporated herein by reference, disclose examples involving dependencies between variables.

In a second master document the following alternative usage tag definitions and variable attribute descriptions may be specified.

| Usage Tag | Usage Statement |
|---|---|
| Start Agreement | TermStart IS 'Agreement Date' |
| Start Absolute | TermStart IS 'Specific Date' |
| Finish Absolute | False |
| Finish Relative | False |
| Finish Open | True |

The relevant variable attribute descriptions may be specified in the master document as follows.

| Name | Alias | Prompt | Type | Form | Selections |
|---|---|---|---|---|---|
| TermStart | Term Start | When does the term start: | select | single | Agreement Date Specific Date |
| StartDate | Term Start Date | Enter the specific start date: | date | | |

In this agreement, the finish is always open. This means that the variables 'FinishDate' and 'Term Period' are not relevant so they are not included in the variable attributes descriptions.

Statement Clause Example

The third set of examples concerns agreements including witness statements which require the inclusion of a statement of truth clause. The statement clause is defined in the clause file STATEMENT_CLAUSE. The statement clause may be included in a master document using the mark-up {include STATEMENT_CLAUSE}. The statement clause file contains the following portion of document content.

This is a true statement made by {Name} of {Address} in the presence of {Witness}:
{Statement}

Signed: _____  ({Name})
Witnessed by: _____  ({Witness})

Since this clause does not contain any usage tags, the master document does not specify any usage tag definitions.

In one particular agreement, it may only be necessary for the statement clause to appear once in the document. In this case the variable attribute descriptions would include the variables 'Name', 'Address', 'Witness' and 'Statement'. However, in some documents, there may be two or more occurrences of the clause. This may be the case for example if a document contains a first witness statement for an applicant and a second witness statement for a respondent. In this case, for each occurrence of the clause, different values need to be assigned to the variables 'Name', 'Address' and 'Statement'. If different witnesses are used for each statement, different values also need to be assigned to the variable 'Witness' for each occurrence of the clause.

This may be achieved by assigning the appropriate values to the variables appearing in the clause file when the clause file is included in the master document. This may be indicated in the master document using the following modification of the include command.

The Applicant's Statement

```
{include STATEMENT_CLAUSE
    ASSIGN ApplicantName         TO    Name
    ASSIGN ApplicantAddress      TO    Address
    ASSIGN ApplicantStatement    TO    Statement
    ASSIGN WitnessName           TO    Witness}
```

The Respondent's Statement

```
{include STATEMENT_CLAUSE
    ASSIGN RespondentName        TO    Name
    ASSIGN RespondentAddress     TO    Address
    ASSIGN RespondentStatement   TO    Statement
    ASSIGN WitnessName           TO    Witness}
```

In this example, the witness for the applicant and the respondent is the same. In this example, in order to generate a customised document, the values for seven variables need to be determined corresponding to the names, addresses and statements of the applicant and respondent, and the name of the witness.

The variable attribute descriptions for these seven variables may be specified in the master document as follows.

| Name | Alias | Prompt | Type | Form |
|---|---|---|---|---|
| ApplicantName | Applicant Name | Name of applicant: | string | |
| ApplicantAddress | Applicant Address | Address: | string | address |
| ApplicantStatement | Applicant Statement | Statement: | string | |
| RespondentName | Respondent Name | Name of respondent: | string | |
| RespondentAddress | Respondent Address | Address: | string | address |
| RespondentStatement | Respondent Statement | Statement: | string | |
| WitnessName | Witness Name | Witness name: | string | |

In some cases, variables appearing in a clause file may not be the same as variables appearing in the master document, but there may be a relationship between the two. In this case, it would not be necessary for a user to provide information relating to both variables. Rather, once one of the variables has been assigned a value, the value of the other variable can be calculated. When the value of a variable can be calculated from the values of one or more other variables the master document may specify how one variables is calculated from the others so that when the master document is processed, the necessary calculation can be applied.

The ASSIGN command appearing within an include command may also be used to assign values or variables to other document elements such as usage tags appearing within the included clause file. For example, in the last example above relating to the governing law clause, the following include command could be used.

{include GOVERNING_LAW_CLAUSE
　　ASSIGN True TO USA
　　ASSIGN False TO Europe
　　ASSIGN False TO Japan}

In this example, no usage tag definitions would be required.

In the example described above relating to the statement clause it was not necessary to replace a usage tag with a definition in the form of a usage statement. However, the variables appearing in the statement clause file are replaced with other variables as defined in the master document within the include command. This allows a generic statement clause file to be used in different masters, or used several times in the same master, even though it may be necessary to assign different values to the variables in the statement clause each time it is used.

It can be seen that the flexibility of a system and method according to the invention is achieved because document elements such as usage tags and variables appearing in a generic clause file are substituted with other document elements defined elsewhere (i.e. not in the clause file), such as in each master document or in document element definition files associated with each master document. Since each master document can define different substitutions or refer to different document element definition files defining different substitutions, each master can use the generic clause file in different ways.

The above method may be carried out by any suitable computer system comprising a processor 1, a memory 3, a display 5 such as a VDU, and one or more input devices 7 such as a keyboard and mouse. The memory 3 is arranged to store various data used in the system, and computer executable code which is executed by the processor 1 to perform various method steps and other processes. The display 5 is used to present the master document and the questionnaire to a user or debugger and the input devices 7 may be used to input information into the system.

A master document used in the system may be implemented for example in the form of a Microsoft Word document which contains various portions of document content such as text and in which the mark-up of the master document is represented by the formatting features of Microsoft Word such as superscript.

The definitions of usage tags and the description of variable attributes may be stored in a header of the master document. The set of usage tag definitions for each clause type may be stored in separate headers or may be stored in a single header. Similarly, the variable attribute descriptions for variables associated with different clause files may be stored in different headers or the same header. The variable attribute descriptions for variables appearing in the master document but not associated with a clause file may be stored in the same header as those for the other variables or in a separate header.

The processor 1 is arranged to retrieve and analyze a selected master document and to automatically generate a questionnaire therefrom. The resulting questionnaire may be in the form of a web page created using HTML for example. The questionnaire may be completed by inputting various information in response to a series of questions presented on the display 5. The user may input information using the input devices 7 for example by typing text into text boxes, by selecting buttons corresponding to different options and so on. The user may also navigate forwards and backwards through the questionnaire amending their answers to the questions. In some embodiments, the questionnaire web page may be accessed independently from several computers connected together by a network. This allows different users to complete different parts of the questionnaire more easily. In some embodiments, the information required to answer some questions may be provided from an external database or other information source.

Figure 2:
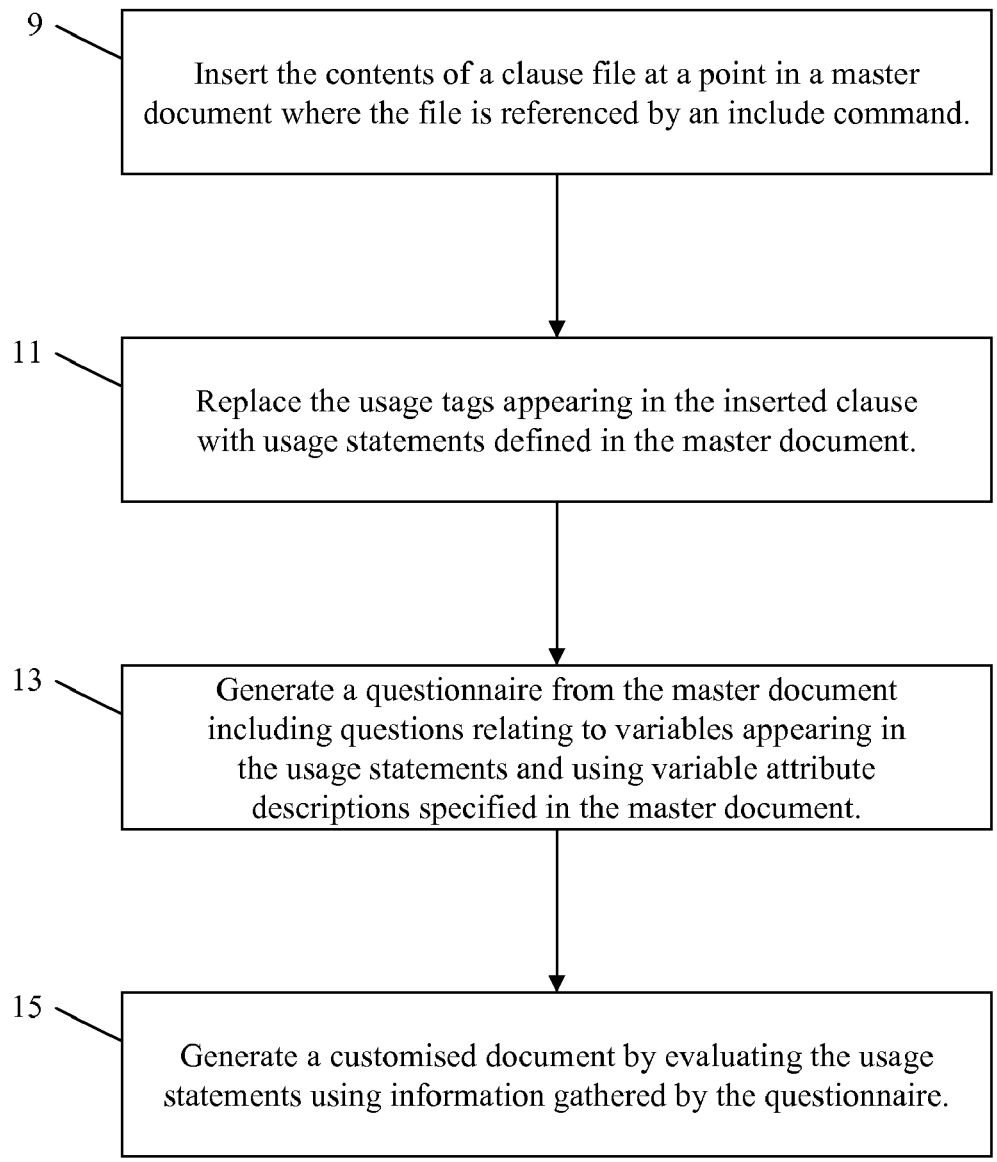
FIG. 2 is a flow chart of a method according to the invention.

As illustrated in FIG. 2, an exemplary method according to the invention comprises a first step 9 of inserting the contents of a clause file at a point in a master document where the file is referenced by an include command. A next step 11 comprises replacing the usage tags appearing in the inserted clause with usage statements defined in the master document. A next step 13 comprises generating a questionnaire from the master document including questions relating to variables appearing in the usage statements and using variable attribute descriptions specified in the master document. A next step 15 comprises generating a customised document by evaluating the usage statements using information gathered by the questionnaire.

Although the examples given above involve clauses comprising portions of text, it is understood that the invention may also be used to generate customised documents involving other forms of document content.

The invention claimed is:

1. A document generation system including a hardware processor and memory storing instructions for generating a customized document comprising:
   instructions for reading a usage tag from a first file which is a clause file used for a plurality of master documents;
   instructions for utilizing the usage tag to identify a first usage statement in a second file, where the first usage statement associates the usage tag with first document content for a first one of the master documents, and wherein a third file includes a second usage statement which associates the usage tag with second document content for a second one of the master documents;
   instructions for obtaining input information to evaluate the first usage statement; and
   generating the customized document based on the first one of the master documents;
   whereby different variations of document content for use with different master documents are associated with a single usage tag in the clause file.

2. The document generation system of claim 1 in which the second file is a master document.

3. The system of claim 2 in which the first usage statement is defined in a header of the first master document.

4. The system of claim 2 including adding to the first master document a reference to the usage tag, and information defining a substitution of the usage tag with the first usage statement.

5. The document generation system of claim 1 in which a predetermined rule defines the usage tag.

6. The document generation system of claim 5 in which the usage tag is a variable located within document content and the predetermined rule names the same variable.

7. The system of claim 5 in which the rule comprises a logical statement depending on one or more variables.

8. The system of claim 1 in which the portion of document content comprises a portion of conditional text.

9. The system of claim 8 in which the portion of document content comprises a clause in a document.

10. The system of claim 9 including adding to the clause document a portion of document content, the portion of document content comprising the usage tag, the clause document being retrievable by the document generation system such that the usage tag can be substituted for a usage statement, the usage statement being defined by information contained in a master document.

11. The system of claim 1 in which the input information is collected using a questionnaire.

12. The system of claim 1 in which the first file is a file referenced by a master document.

13. The system of claim 1 in which the master document comprises information describing the attributes of one or more variables.

14. The system of claim 13 in which the information is used to configure one or more questions in the questionnaire relating to the variables.

* * * * *